March 3, 1953   F. WUNDERLICH   2,630,027
BORING AND FACING HEAD
Filed Aug. 7, 1948   2 SHEETS—SHEET 1

Inventor
FRIEDRICH WUNDERLICH
By Blair, Curtis & Hayward
Attorneys

March 3, 1953 F. WUNDERLICH 2,630,027
BORING AND FACING HEAD
Filed Aug. 7, 1948 2 SHEETS—SHEET 2
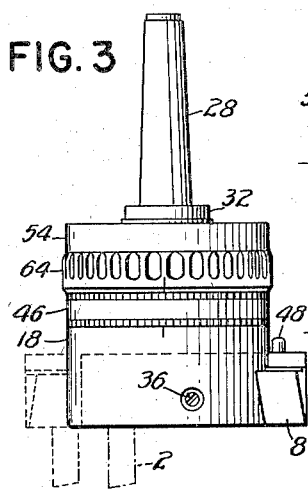
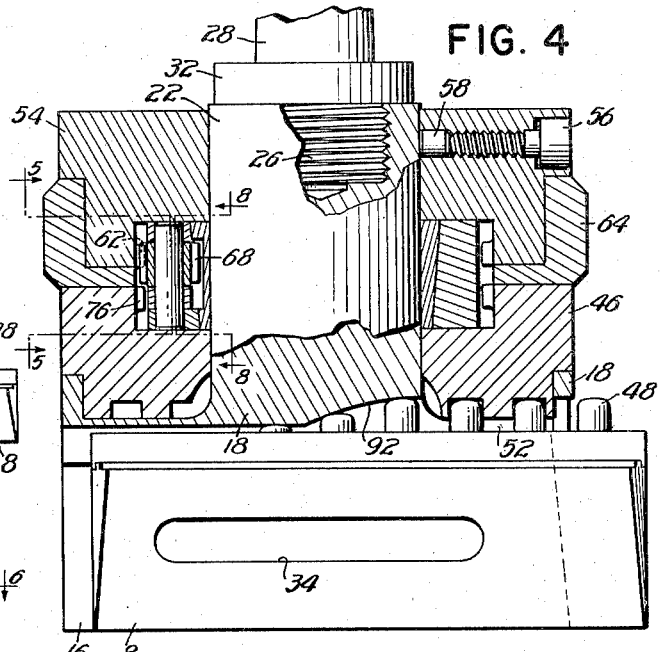
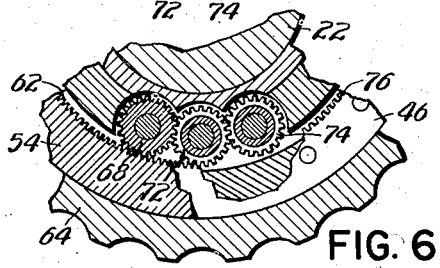
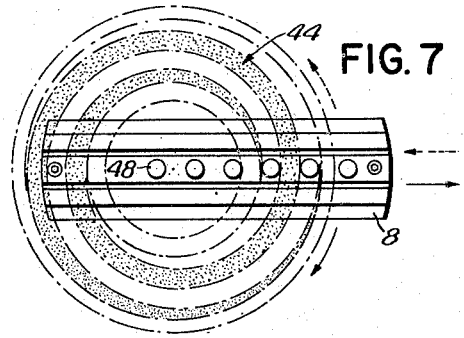
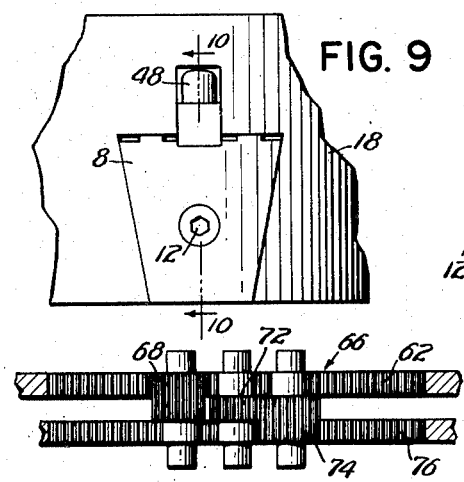
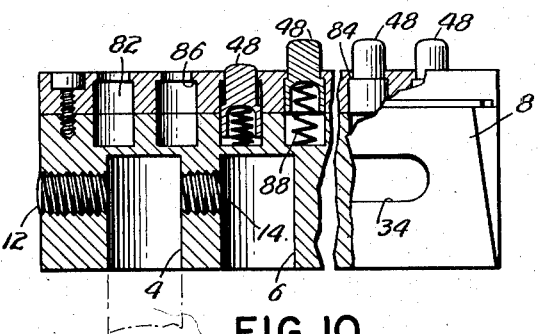
Inventor
FRIEDRICH WUNDERLICH
By
Blair, Curtis & Hayward.
Attorneys Patented Mar. 3, 1953

2,630,027

UNITED STATES PATENT OFFICE 2,630,027

BORING AND FACING HEAD

Friedrich Wunderlich, Valley Stream, N. Y., assignor of one-half to Elton T. Barrett, New York, N. Y.

Application August 7, 1948, Serial No. 43,119

6 Claims. (Cl. 77—58)

This invention relates to a machine tool for use in boring and facing operations. More particularly, it relates to a toolhead that is adjustable for boring operations and which provides power feed for facing operations by converting the rotary motion of a boring machine to radial motion.

Such combination boring and facing heads are widely used and provide a most convenient means for performing many types of operations. However, tools of this general type, presently in use, have several disadvantages that limit their versatility and convenience. For example, in many of these tools, the vertical distance between the chuck, or other source of rotative power, and the workpiece is so great that the tools cannot be used for many tasks; particularly where the vertical height, that is, the thickness of the workpiece is relatively large.

Furthermore, these tools have a relatively limited transverse movement so that many operations are difficult to perform that otherwise could be completed with relative ease. Moreover, the usual construction of these tools is such that in order to increase the maximum lateral stroke, it is necessary to provide a toolhead with greater height; thus, further reducing its versatility.

Another disadvantage of present tools is that accurate calibration is difficult; the smallest divisions of the scales quite commonly representing a lateral movement of .001 inch.

In addition, in many types of toolheads it is difficult to return the tool to its initial position after outward transverse movement of the toolholder. For example, a worm and gear arrangement is often provided for driving the tool holder transversely and which must be disengaged before the toolholder can be returned to its initial position. Even then, it is ordinarily necessary to rotate a feed screw, which usually has a small pitch, in order to return the toolholder; this time-consuming operation becoming particularly tedious when a number of facing cuts must be taken.

Accordingly, it is an object of the present invention to provide an improved boring and facing head that overcomes many of these disadvantages, that is economical to construct and sturdy and versatile in operation.

Another object is to provide such a tool having a large lateral stroke, and in which the maximum transverse movement is not limited inherently by the construction of the head, but more by the nature of the workpiece and the operation to be performed.

It is another object to provide a boring and facing head in which the clearance required between the driving machine and the workpiece is smaller than that required by conventional boring and facing heads.

Another object is to provide such a tool in which the transverse stroke may be increased beyond ordinary limitations without materially increasing the vertical height of the tool, that is, without increasing materially the clearance required between the chuck, or other mounting device, and the workpiece.

Still another object of this invention is to provide a boring and facing head constructed so that accurate calibration with fine divisions can be provided easily; permitting precision control of the transverse movement.

A further object is to provide such a tool having a micrometer-vernier type calibration.

A further object is to provide such a tool in which the calibration is accomplished by two separate scales on relatively movable scale pieces which are, in addition, functional portions of the toolhead proper.

Still another object of this invention is to provide a boring head easily adapted for operation over various ranges of boring radii without requiring replacement of the entire head portion.

These and other objects will be in part apparent from and in part pointed out in the following description taken in conjunction with the following drawings, in which:

Fig. 3 is an elevational view, on a reduced scale, of the toolhead shown in Figs. 1 and 2;

Fig. 4 is an enlarged vertical section through the toolhead shown in Fig. 3;

Fig. 5 is a partial sectional view taken along line 5—5 of Fig. 4;

Fig. 6 is a fragmentary sectional view taken along line 6—6 of Fig. 5;

Fig. 7 is a diagrammatic view, on reduced scale, to show the radial driving gear arrangement;

Fig. 8 is a partial sectional view taken along line 8—8 of Fig. 4;

Fig. 9 is an enlarged fragmentary side view of the toolhead shown in Fig. 3; and Fig. 10 is view taken along line 10—10 of Fig. 9.

The particular tool arrangement to be used with the toolhead to be described depends upon whether it is being utilized for boring, facing, grooving, turning, or undercutting and upon the characteristics of the particular workpiece involved in the operation. The various cutting tools and arrangements for holding the tools are well known and, accordingly, are not described herein.

Figure 1:
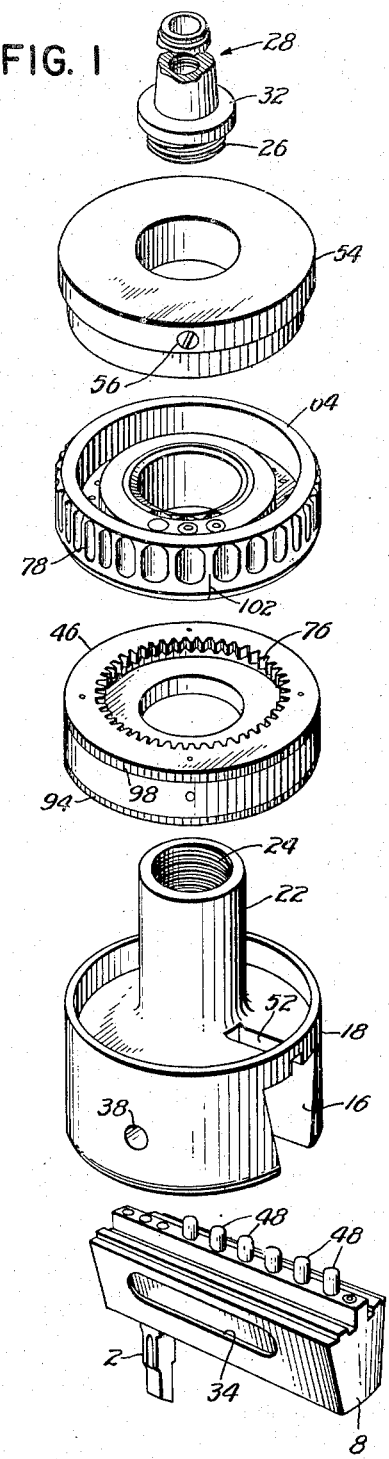
Fig. 1 is an exploded perspective view showing the principal parts of a toolhead embodying the present invention, viewed from an angle above the toolhead.

For the purposes of illustrating this embodiment of the invention, a cutting tool 2 (Fig. 1) is shown which performs the actual cutting operation and is supported removably in either of two downwardly extending openings 4 and 6 (Fig. 10) in a slide 8. If the tool 2 is inserted in hole 4, a set screw 12 is utilized to lock the tool in place, and if inserted in opening 6, a screw 14, accessible by removing screw 12, secures it firmly in place.

Figure 2:
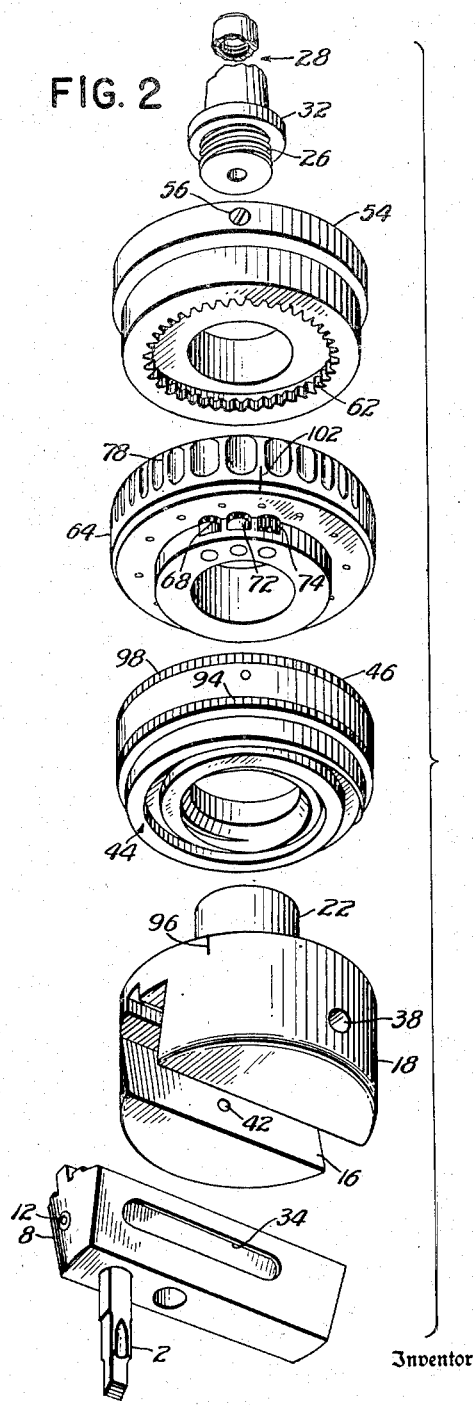
Fig. 2 is a similar view from an angle below the toolhead.

In order to secure the slide 8 so that it can be rotated, the slide is fitted into an open channel 16 in a slide supporting block 18 (Figs. 1 and 2), the upper portion of which is of reduced diameter forming an upwardly extending cylindrical shaft portion 22. The upper end of shaft portion 22 is internally threaded, as at 24, and is in engagement with a threaded portion 26 of a spindle 28; the upper end of shaft portion 22 abutting the lower surface of a shoulder 32 on spindle 28. The upper portion of the spindle 28 may be provided with a standard taper to permit the use of various taper attachments, in accordance with the requirements of various boring machines, so that the toolhead may be secured easily to the chuck of a boring machine or other source of rotative power (not shown).

Thus, these components form a rigid structure; the spindle 28, slide support block 18, the slide 8, and the cutting tool 2 rotating as a unit about the vertical center line of the shaft portion 22.

In order to provide the desired stability for the sliding structure, comprising the slide 8 and block 18, the walls of the channel 16 extend downwardly and inwardly, the cross-sectional shape of the slide 8 being such as to fit within the channel 16, so that the slide can move smoothly in its longitudinal direction, but so that excessive sidewise or lateral movement is prevented.

To insure that the slide 8 does not move sideways as it traverses the channel 16 and to compensate for slight wear or uneveness in the slide 8 or the surfaces of channel 16, a soft metal insert 42 (Fig. 2) is slidably positioned in an opening in the sidewall of channel 16 so as to press against the smooth face of the slide 8; an adjustment screw (not shown) being provided for applying the desired pressure.

To prevent the slide 8 from moving too far in either direction, a shallow groove 34 is provided in one side of the slide 8 into which the end of a screw 36 extends, the screw 36 being in threaded engagement with an opening 38 extending from the channel 16 to the outside of the block 18.

In order to provide a power drive for the radial movement of the cutting tool 2, the rotary motion of the toolhead is utilized, by means of a differential gear arrangement and an Archimedean spiral drive to be described, to move the slide 8 radially while the toolhead is rotating.

The conversion from rotary motion to linear motion is accomplished by a spiral thread, generally indicated at 44 (Figs. 2 and 7) formed on the lower side of a floating spiral drive collar 46; the pitch of the spiral thread being equal to the spacing of a series of aligned pins 48 (Figs. 1 and 10), which project upwardly from the slide 8; the pins 48 extending into the spiral thread 44. These pins 48 extend upwardly thru a slot 52 in the block 18 to engage the spiral thread 44 on the lower surface of the floating collar 46, which fits within a recessed portion on the upper surface of block 18. With this arrangement, relative rotary motion between block 18 and the collar 46 causes transverse or radial movement of the slide 8. This relative motion is obtained by means of a gear drive arrangement comprising an upper collar 54 (Figs. 2 and 4) which surrounds shaft portion 22 of block 18 and is secured releasably thereto by a set screw 56 and a clamping block 58 slidably mounted in the inner end of an opening in upper collar 54, into which the set screw 56 is threaded. For cutting operations, set screw 56 is tightened so that the upper collar 54 becomes integral with shaft portion 22. The lower surface of upper collar 58 is recessed and provided with gear teeth 62 formed on the vertical inner wall of the recessed portion, so that, in effect, an internal ring gear is secured to upper collar 54. A control collar 64 is rotatably mounted on the shaft portion 22 immediately below the upper collar 54; the upper portion of the control collar 64 being suitably recessed so that the ring gear portion of upper collar 54 nests within the control collar. The collar 64 supports a gear train, generally indicated at 66, comprising vertically offset gears 68, 72 and 74, shown most clearly in Figs. 5 and 8. The internal gear 62 engages the gear 68 which drives gear 74 by means of the intermediate gear 72. The gear 74 is engaged with a gear 76 which is formed on the vertical inner surface of a recessed portion in the upper surface of the floating collar 46, forming, in effect, an internal ring gear integral with the collar 46.

In operation, so long as the rotary movement of the control collar 64 is unrestrained, the entire toolhead will rotate as a unit, and there will be no relative motion between the gear assemblies and no radial movement of the slide 8. However, radial movement of slide 8 may be caused by preventing rotary motion of the control collar 64 while the toolhead is rotating; this collar being provided with an outer knurled surface, as at 78, so that it may be gripped conveniently. When this collar is restrained, the rotary motion of gear 62 drives the gear train 66 which, in turn, drives the floating collar 46. The relative motion between collar 46 and block 18 is obtained by virtue of the fact that gears 62 and 76 do not have the same number of teeth.

As an illustration, suppose that gear 62 has 99 teeth around its circumference whereas gear 76 is provided with 100 teeth around its circumference. Thus, during one revolution of the spindle 28, 99 teeth of gear 62 will move past a given point, causing gear train 66 to drive gear 76 in such manner that 99 teeth of this gear will pass a given point. This causes the gear 76 and, accordingly, floating collar 46, to rotate slightly less than one revolution. However, block 18 will have moved exactly one revolution because it is secured for rotation with the spindle 28 and with the upper collar 56. Thus, for each 100 revolutions of the spindle 28, there will be 99 revolutions of the spiral 44 which, therefore, will rotate one revolution relative to the block 18 and, thus, advance the slide in a radial direction a distance equal to the pitch of spiral 44, that is to say, a distance equal to the distance between the center lines of adjacent slide drive pins 48. Thus, the radial movement of slide 8 may be controlled easily and accurately by releasing or grasping the control collar 46.

In addition, this method of control eliminates the necessity for incorporating shear pins or other protective devices in the structure because, if, for any reason, the tool becomes jammed, the control collar 46 will not be restrained with such force as to damage the working portions of the tool.

In order that the transverse movement of the slide 8 will not be limited, means are provided which permit the pins 48 to engage the spiral threads on one side only. To this end, the pins 48 are slidably mounted within openings 82 (Fig. 10) in the slide 8; each of the pins 48 being retained in the opening by a shoulder 84 which impinges against an offset 86, formed by reducing the diameter of the opening 82 near the upper surface of slide 8. A small compression spring 88 is mounted beneath the pin 48 in each opening 82 and applies an upward force to the pin. Thus, the pins 48 extend upwardly above the surface of slide 8, but are supported yieldably so that they can be recessed into slide 8 by exerting sufficient downward force on the pins 48 to overcome the upward force of spring 88.

This downward force is provided by a cam surface 92 (Fig. 4) formed within the block 18. For example, assume that the floating spiral drive member 46 is rotating in such direction relative to the block 18, that the slide 8 is caused to move from right to left, as seen in Fig. 4. It is seen readily that the pins 48 first engage the right-hand portion of spiral 44 and that, as the spiral 44 continues to rotate, the pins leave this portion of the spiral thread, strike the cam surface 92 and are forced gradually downwardly into the body of slide 8, so that as the slide 8 continues its leftward travel the pins are recessed in the block during the time that they are adjacent the left-hand portion of the spiral 44 and, accordingly, do not engage this portion of the spiral. Thus, so far as the driving mechanism is concerned, the slide 8 may be of any length; the spiral gear arrangement moving it continuously through the block 18.

In order to return the slide 8 quickly and easily to its original position when the radial cutting stroke has been completed, the set screw 56 is loosened so that upper collar 54 is free to rotate relative to block 18. This releases the floating spiral drive collar 46 so that it may be rotated manually, by hand, to return the slide 8 quickly to any desired position.

It is apparent that many unique advantages are inherent in the construction and operating principles of this toolhead, and that various embodiments will be made in accordance with the particular use and application to which the toolhead is to be put. For example, the tool may be modified for performing cutting operations in large castings by extending vertically the shaft portion 22 of the tool and the floating spiral drive collar 46, so that the slide 8 and the radial driving mechanism therefor can be inserted within a bore in the casting, with the control collar being maintained at a point near the chuck of the boring tool, so that control of the lateral cutting operation is effected above the upper surface of the casting.

Moreover, the tool arrangement is particularly well suited for the incorporation of calibrating scales without additional moving parts. For example, this can be accomplished by inscribing suitable scale marks, as at 94 (Fig. 2), on the lower portion of the outer surface of floating collar 46 to cooperate with one or more scale marks, as at 96, on the upper portion of the outer surface of block 18. Thus, one complete revolution of the scale 94, relative to the mark 96, represents a radial movement of the slide 8 equal to the horizontal spacing of pins 48. Thus, if the pins are spaced, for example, 0.25 inch apart, and the floating collar 46 is 3 inches in diameter, a scale 12 inches in length is provided, which represents a radial movement of the cutting tool of only 0.25 inch. Thus, scale divisions may be provided easily which permit precision control of the lateral movement of the cutting tool. Furthermore, a scale having even more precise readings may be provided, which may be utilized to cooperate with the scales described above in the manner of a vernier, by placing suitable calibrations, as at 98, on the upper portion of the outer surface of floating collar 46 to cooperate with one or more scale marks, as at 102, on the lower portion of the outer surface of control collar 64. The vernier effect may be achieved by relating the scale divisions so that the entire scale 98 corresponds to one division of scale 94.

In accordance with the provisions of the statutes, the best form of the invention now known has been illustrated and described, however, it will be apparent to those skilled in the design or use of machine tools that various changes can be made in the form of the toolhead disclosed without departing from the spirit of the invention as set forth in the appended claims, and that certain features of the invention may sometimes be used to advantage without a corresponding use of other features. For example, the pins 48 may be made rigid with respect to slide 8, and the springs 88 eliminated, in those cases where sufficient lateral movement can be obtained without this feature.

I claim:

1. A boring and facing head comprising, in combination, a tool, a slide for supporting said tool and having spaced aligned projections on the upper surface thereof, a slide supporting block having an open channel therein for slidably supporting said slide and including integrally therewith a shaft portion extending upwardly from said block, a floating collar rotatably supported on said shaft portion and including a first internal gear formed integrally therewith and having a spiral gear on the lower surface thereof in threaded arrangement with said projections, a second internal gear having a different number of teeth from said first gear and secured for rotation with said shaft portion, a control collar surrounding said shaft portion and interposed vertically between said first and second internal gears and including a gear train comprising an odd number of gears and engaged with said first and second internal gears whereby relative rotation between said control collar and said block causes relative rotation between said spiral gear and said slide thereby to move said slide radially of said boring and facing head.

2. A boring and facing head comprising, in combination, a tool, a slide for supporting said tool and having spaced depressable projections on the upper surface thereof, spring means biasing said projections toward the projected position, a slide supporting block having an open channel therein for slidably supporting said slide, a radial slot open upwardly from said channel, and a cam surface, a shaft portion connected to and extending upwardly from said block, a floating collar rotatably supported on said shaft portion and having a spiral gear on the lower surface thereof in threaded arrangement with said projections which extend upwardly through said slot, a gear secured for rotation with said shaft portion, differential gearing means coupling said gear to said floating collar, and a control collar surrounding said shaft portion and adapted to render said differential gearing means operative when restrained from rotation thereby to cause said slide to progress radially of said toolhead, said cam surface being arranged to progressively depress said projections as said slide moves radially thereby to permit free rotation of said spiral and unlimited movement of said slide.

3. A boring and facing toolhead in which a cutting tool is arranged to be rotated and to move radially under control of the operator, said toolhead comprising a vertically extending tapered spindle, a slide supporting block having an open transverse channel and an upwardly extending right cylindrical extension secured to the lower end of said spindle, a slide mounted for transverse movement in said channel, a plurality of depressable pins projecting from said slide, a spring associated with each of said pins biasing it toward the projected position, a feed screw rotatably mounted on said extension and comprising an Archimedean spiral thread engaging said pins, a cam surface positioned to cause said pins to be depressed as they move laterally from one side to the other of said supporting block, a ring gear portion having internally extending teeth and formed integrally with said feed screw, a drive gear releasably secured to said extension and having internal gear teeth, a rotatably mounted hand control collar interposed between said drive and ring gears and having an odd number of gears arranged to couple said drive to said ring gear and adapted for epicyclic movement with respect thereto, relatively movable primary scale indications associated with said feed screw and said slide supporting block, and relatively movable secondary scale indications associated with said control collar and said feed screw.

4. A boring and facing toolhead in which a cutting tool is arranged to be rotated and simultaneously moved radially, comprising a vertically extending tapered spindle, a slide supporting block having an open transverse channel, an upwardly extending shaft secured to said block and to the lower end of said spindle, a slide mounted for transverse movement in said channel, a plurality of spaced aligned depressable pins projecting from said slide, a coiled compression spring within each of said pins biasing them individually toward the projected position, a feed screw rotatably mounted on said extension and comprising an Archimedean spiral thread engaging said pins, a cam surface positioned to cause said pins to be depressed as they move laterally from one side of said supporting block toward the other, a ring gear portion secured for rotation with said feed screw, a drive gear releasably secured to said shaft, and a rotatably mounted hand control collar interposed between said drive and ring gears and having an odd number of gears arranged to couple said drive gear to said ring gear and adapted for epicyclic movement with respect thereto.

5. A boring and facing head adapted under a first condition of operation to move a cutting tool so as to describe a circle of constant radius and under a second condition of operation to cause said tool to describe a spiral, said toolhead comprising an upwardly extending spindle portion for supporting the toolhead and adapted to be rotatively driven, a slide supporting block secured to said spindle, a slide supported for guided movement by said block, tool holding means associated with said slide, a plurality of drive pins movably mounted to project from said slide and depressable thereinto, a cam surface positioned to cause said pins to be depressed as they move laterally from one side of said supporting block toward the other, a spiral thread rotatively mounted with respect to said block and engaging said pins, a first gear secured to said spiral, a second gear secured for rotation with said block, a control collar, an epicyclic gear system supported by said collar and adapted under said first condition of operation produced by non-restraint of said collar to move bodily with said first and second gears and under said second condition of operation produced by manual restraint of rotary movement of said collar to transmit rotary movement at a predetermined speed differential from said second to said first gear, whereby when said collar is restrained said spiral rotates relative to said slide causing said slide to progress radially.

6. A boring and facing head comprising a tool, a slide for supporting said tool and having at least one projection on the upper surface thereof, a slide supporting block having an open channel therein for slidably supporting said slide, a floating collar rotatably supported on said shaft portion and including a first internal gear formed integrally therewith and having a spiral gear on the lower surface thereof in engagement with said projection, a second internal gear having a different number of teeth from said first gear and secured for rotation with said shaft portion, a control collar surrounding said shaft portion and interposed vertically between said first and second internal gears and including a gear train comprising an odd number of gears and engaged with said first and second internal gears whereby relative rotation between said control collar and said block causes relative rotation between said spiral gear and said slide thereby to move said slide radially of said boring and facing head.

FRIEDRICH WUNDERLICH.

REFERENCES CITED

The following references are of record in the file of this patent:

UNITED STATES PATENTS

| Number | Name | Date |
|---|---|---|
| 74,173 | Tuttle | Feb. 4, 1868 |
| 128,240 | Morton | June 25, 1872 |
| 1,463,686 | Frey et al. | July 31, 1923 |
| 2,093,743 | Steiner | Sept. 21, 1937 |

FOREIGN PATENTS

| Number | Country | Date |
|---|---|---|
| 549,904 | Germany | May 6, 1932 |
| 567,411 | Great Britain | Feb. 13, 1945 |